3,531,416
PROCESS FOR PRODUCING UO$_2$-PuO$_2$ OXIDE COMPOSITIONS
Hideo Akutsu, Kazuhiko Yoshioka, and Naomi Tsunoda, Naka-gun, Ibaragi Prefecture, Japan, assignors to Power Reactor and Nuclear Fuel Development Corporation
No Drawing. Filed Feb. 23, 1968, Ser. No. 707,429
Claims priority, application Japan, Feb. 25, 1967, 42/11,716, 42/11,717
Int. Cl. C09k 3/00; G21c 19/42
U.S. Cl. 252—301.1
12 Claims

ABSTRACT OF THE DISCLOSURE

A UO$_2$-PuO$_2$ oxide composition of high density having coarse particles, suitable for accomplishing vibratory compaction in the preparation of fuel rods, produced by mixing uranium hydroxide gel and plutonium compounds in different states such as gel, precipitate, or powder, followed by drying, dehydrating, and sintering.

BACKGROUND OF THE INVENTION

Field of the invention

This invention relates to processes for producing a UO$_2$-PuO$_2$ oxide composition, and more particularly, to processes of producing a UO$_2$-PuO$_2$ oxide composition of high density having coarse particles which are suitable for carrying out vibratory compaction for fuel preparation.

Description of the prior art

A great need for a UO$_2$-PuO$_2$ mixed oxide exists in industry for use as fuel in thermal neutron reactors and fast breeder reactors. Difficulties and inconveniences have been experienced in producing UO$_2$-PuO$_2$ mixed oxides by conventional processes, particularly because of plutonium properties, such as high radioactivity and the consequent health risk.

SUMMARY OF THE INVENTION

Accordingly, objects of the invention are: to provide an improved and simple process of producing a UO$_2$-PuO$_2$ mixed oxide composition whose particles are of high density, the majority of the particles having a relatively large and massive particle size; to provide particles of a UO$_2$-PuO$_2$ composition, in which particles the distribution of UO$_2$ and PuO$_2$ is uniformly homogeneous; to provide particles of a UO$_2$-PuO$_2$ composition, said particles having substantially zero cracks and voids; to provide an inexpensive process for producing particles of a UO$_2$-PuO$_2$ mixed oxide composition.

In its broad aspect, the invention is the following process and the product resulting therefrom. Uranium gel is first produced. Then, a finely divided plutonium oxide substance is blended into the gel until there is a homogeneous intermixing of substance with gel. Then, the mixture is heat treated to fix the uranium and plutonium intermixture as solid mixed-oxide particles containing uniformly dispersed UO$_2$ and PuO$_2$. Appropriate measures are taken throughout the process to assure that the final oxygen to metal ratio is substantially 2.00.

Other objects and many of the attendant advantages of this invention will be readily appreciated as the same becomes better understood by reference to the following detailed description.

DESCRIPTION OF THE PREFERRED EMBODIMENTS

Uranium oxide and plutonium oxide gels are produced in the invention by hydrolyzing acidic uranium and plutonium ionic solutions through the addition of a weak base such as ammonium hydroxide. Thus, for example, ammonium hydroxide may be added to hydrochloric or nitric acid system uranous or plutonium solution to produce hydrated uranous or plutonium hydroxide sol, respectively. Heating and aging the sols so produced gives uranous or plutonium oxide gel.

More specifically for uranium, a predetermined amount of ammonium hydroxide is added to a uranium tetrachloride or uranous nitrate solution to produce a dark green or black uranium hydrosol. If the solution contains uranium tetrachloride, it has been discovered by comparative tests that the highest density, best uniformity of oxide distribution, and an oxygen to metal ratio of 2 are obtained, if the volume of ammonium hydroxide added is determined by the following empirical formula:

conc. NH$_4$OH ml. (per liter of the feed solution)
$$= \alpha X + 0.476 Y + 1.828 Z$$

| $\alpha$: | Free HCl (g./l.) |
|---|---|
| 0.952 | 6–15 |
| 0.967 | 16–25 |
| 0.981 | 26–35 |

Where:
X=U$^{+4}$ (g./l.),
Y=U$^{+6}$ (g./l.),
Z=free HCl(g./l.)

The hydrosol thus produced is stirred, and diluted with distilled, demineralized water.

The diluted hydrosol is aged for about 20 hours at 95° C. and then decanted to separate the supernatant liquid from settled uranium gel. The uranium gel so obtained is purified by then adding distilled, demineralized water and decanting after the gel has settled. This purifying step is repeated two or three times. At the end of aging, the crystallite size in the gel has grown to about 200 A.

It is an advantage of the invention that it is not necessary to handle hydrated uranium oxide gel, if not highly enriched, in the tedious, glove equipped hoods of the industry. Such glove boxes are indispensible for the handling of plutonium.

The steps for preparing plutonium gel for the invention are the same in principle as those described above for uranium. However, a plutonium solution such as that of plutonium nitrate has disproportionation reactions.

Thus, plutonium exhibits four oxidation states in aqueous solution: Pu (III), Pu (IV), Pu (V), and Pu (VI). In order to adjust the valency to four, hydrogen peroxide, H$_2$O$_2$, is added to the feed solution.

After valency adjustment, a Pu (NO$_3$)$_4$ solution is brought to a pH of about 1 by the addition of ammonium hydroxide. This causes formation of plutonium hydrosol. The rest of the steps needed to bring the hydrosol to a final product of plutonium gel are the same described above for uranium.

While plutonium gel is one of the plutonium compounds adequate for mixing with uranium gel in the invention, it is also possible to use plutonium hydroxide precipitate. This may be produced by adding sufficient ammonium hydroxide to the above Pu (NO$_3$)$_4$ solution to bring the pH to between 3 and 10. The precipitate is purified by repeated addition of distilled water, followed by decanting after settling, as above.

Powdered plutonium compounds can be used as well in the present invention.

It is possible by accurately determining the plutonium compounds in powdered form to control by elementary chemical mathematics the Pu/U ratio desired in the fuel element. Suitable powdered plutonium compounds for this invention are, for example, plutonium oxalate; plutonium dioxide obtained by calcining the plutonium oxalate; plutonium hydroxide; pulverulent plutonium peroxide obtained by the addition of hydrogen peroxide solution to plutonium nitrate solution; and pulverulent plutonium dioxide obtained by calcining such plutonium peroxide.

The described plutonium compounds are added in the form of gel, precipitate or powder to the uranium gel in a glove box in predetermined amounts fixed by the desired Pu/U ratios. For example, Pu/U below 5% is desired in the case of fuels for thermal reactors, while the range 20% to 40% is favored in the case of fuels for fast breeder reactors. After addition, stirring of the resultant gel mixture is continued from 1 to 4 hours.

The stirring is carried out at a temperature of the order of 80 to 120° C. so as (1) to maintain a favorable viscosity in the gel to prevent separation and segregation of the plutonium and uranium constituents (if the gel becomes too fluid, the different specific gravities of the plutonium and uranium constituents lead to a loss of the intermixing), (2) to improve homogeneity of the mixture, (3) to release absorbed gases from any powdered plutonium compounds used, and (4) to furnish some activity to the surface of the powdered plutonium compound particles.

In order to obtain a particle size suitable for effecting a vibratory compaction step and to obtain massive and dense particles having uniform oxide distribution and having few voids and cracks, it has been found essential to allow the gel mixture to concentrate during the stirring by evaporation until the plutonium plus uranium content reaches 40 to 50 weight percent.

Drying following the concentrating step is carried out by conventional techniques.

Dehydration following drying is carried out at sufficient temperature to remove moisture and volatile substances, mainly $NH_4NO_3$, $NH_4Cl$, and bound $H_2O$, from the dried gel mixture.

Sintering is carried out to sinter the dehydrated gel mixture to a high density and to reduce a higher oxygen to metal ratio to a stoichiometric value of 2.00.

The $UO_2$-$PuO_2$ mixed oxide particles resulting from the process of the invention have a density of nearly 95% of theoretical, or more.

The product particle size is large and often needs a slight crushing to obtain a particle size distribution best suited for effecting vibratory compaction. A preferred particle size distribution according to this invention is 60% between 6 and 8 mesh, 20% between 35 and 65 mesh, and 20% below 200 mesh. The homogeneity of the plutonium and uranium distribution in the particles and the density of the particles are nicely suited for the preparation of fuel rods by the vibratory compaction process.

The steps after the addition of the plutonium compounds to the uranium oxide gel are relatively simple and thus the probability of radiative risks may be lessened.

The following examples are given only to illustrate the practice of our novel invention and in no way are to be construed as limiting the scope of our invention.

EXAMPLES

The preparation of the uranium gel is as follows:

A feed solution is prepared with 100 grams of uranous chloride per liter and 5 grams of uranyl chloride per liter. A dark green or black uranium hydrosol is produced by the addition of a determined amount of ammonium hydroxide to the feed solution. The hydrosol thus produced is stirred for about 20 minutes and diluted with demineralized water. The hydrosol is then aged for about 20 hours at 95° C., and this is followed by decanting to separate the supernatant liquid from settled uranium hydroxide gel. The uranium hydroxide gel is purified by repeated flushing 2 or 3 times with demineralized water, complete with aging to reach chemical equilibrium, and decantation. Properties of the uranium hydroxide gel so produced are shown below:

TABLE 1

Uranium concentration of the gel (g./l.) ......... 250
Weight percent of Cl ions to U .............. Below 2
pH .................................................. 1.4

Below is a description of the preparation of five different preferred plutonium compounds. They are in the form of gel, precipitate, or powder. They are mixed with the above-described uranium hydroxide gel to yield at least five examples of the invention, combinations of these being obvious alternatives.

The preparation of plutonium gel and plutonium hydroxide precipitate are as follows:

A plutonium nitrate solution containing 50 to 100 grams of plutonium per liter and of about 1 M acidity is first prepared. Then, $NH_4OH$ is added to form plutonium hydrosol at pH 1. The sol is stirred, diluted with demineralized water, and aged for about 20 hours at 95° C. After aging, the supernatant liquid is decanted. Alternate introduction and decanting of demineralized water yields a purified gel product.

The plutonium hydroxide precipitate is obtained by addition of sufficient ammonium hydroxide to bring the pH of the plutonium hydroxide solution to between 3 and 10. The hydroxide precipitate is similarly purified by the repeated introduction and decantation of demineralized water.

Properties of the plutonium hydroxide gel and plutonium hydroxide precipitate produced in the manner above described are shown below:

TABLE 2

| Run No.: | | Plutonium concentration (g./l.) | Residual $NO_3$, percent | pH |
|---|---|---|---|---|
| 1 | Plutonium gel | 2.7 | 1.4 | 1.5 |
| 2 | Plutonium hydroxide precipitate | 100.0 | (¹) | 7.5 |

¹ Below 1.0.

The preparation of the preferred powdered plutonium compounds is as follows:

Referring first to the preparation of $PuO_2$ (oxalate derived), valency-adjusted plutonium nitrate (IV) solution is prepared by adding a hydrogen peroxide solution to a plutonium nitrate solution containing about 100 grams of plutonium per liter and about 5 M of nitric acid. Plutonium oxalate, $Pu(C_2O_4) \cdot XH_2O$, is precipitated by adding an about 30% excess oxalate solution to the described plutonium nitrate (IV) solution. The precipitate so produced is washed with fresh demineralized water. The precipitate is then dried for about 20 hours at 130° C. This drying is followed by a calcination at 800° C. in air to form a powdered plutonium oxide.

The preparation of plutonium peroxide is as follows:

Plutonium peroxide is precipitated by the addition of hydrogen peroxide to plutonium nitrate solution. The precipitate so formed is washed with fresh demineralized water and then dried for periods of about 20 hours at 130° C.

The preparation of $PuO_2$ (peroxide derived) is as follows:

The above-described plutonuim peroxide is calcined for 1 hour at 450° C. in air. This yields powdered $PuO_2$.

Properties of the powdered plutonium compounds thus prepared are shown below:

TABLE 3

| | Precipitate | Specific surface area,[1] (m.²/g.) | Particle size [2], μ |
|---|---|---|---|
| Run No.: | | | |
| 3 | PuO₂ Oxalate | 3.97 | 0.80 |
| 4 | PuO₂ Peroxide | 18.00 | 0.65 |
| 5 | peroxide do | ([3]) | ([3]) |

[1] BET method.
[2] Fisher's Sub Seive Sizer.
[3] Not measured.

As is indicated in Table 3, the particle sizes used in the invention are small, in order to assure intimate intermixing in the final product. While the gels have infinitesimal particle sizes and may be considered as liquids, the particle sizes of the powders and precipitates are determined by the particular chemical steps leading to their formation. Should clumping occur, the clumps are first mechanically broken down before mixing. This mechanical treatment yields the individual particles sizes of Table 3.

The mixing, heating and concentrating operations are as follows:

Two hundred milliliters of the uranium hydroxide gel of Table 1 are mixed with an amount of the plutonium gel of Table 2 containing 1.5 grams of plutonium. Mixtures are prepared using the other four plutonium compounds in analogous manner. Mixing of the powdered compounds is carried out after they have been ground down. The five resulting mixtures are stirred at a temperature just below the boiling temperature until evaporation results in plutonium plus uranium concentration equal to 45 weight percent.

Drying of the five concentrated gel mixtures is in air at 60° to 95° C. for 1 to 3 days.

The dehydrating operation is effected by placing the dried gel mixtures in Hastelloy boats. These boats are run through a furnace tube made of Hastelloy. Dehydration is carried out at 800° C. for 2 hours. A heating rate of 50° C. per hour is used. The dehydrating atmosphere is 5 vol. percent H₂ and 95 vol. percent N₂.

In the sintering operation, the dehydrated gel mixtures are placed in molybdenum boats. Heating with a heating rate of 100° C. per hour and sintering at 1400° C. for 3 hours are carried out with the help of an automatic program controller. The sintering atmosphere is also 5 vol. percent H₂–N₂.

Properties of the five products according to the above-described experiments are shown in Table 4.

TABLE 4

| | Plutonium compounds | O/M [1] | Density[2], percent TD | Pu/(U+Pu), percent |
|---|---|---|---|---|
| Run No.: | | | | |
| 1 | Plutonium gel | 2.01 | 95.9 | 3 |
| 2 | Plutonium hydroxide precipitate | 2.02 | 95.3 | 3 |
| 3 | Powdered PuO₂ (oxalate derived) | 2.00 | 94.8 | 3 |
| 4 | Powdered plutonium peroxide | 2.01 | 94.4 | 3 |
| 5 | Powdered PuO₂ (peroxide derived) | 2.01 | 96.0 | 3 |

[1] O/M equals oxygen to metal ratio in moles per mol.
[2] The measurement was carried out under a pressure of 100 mm. Hg. The theoretical density (TD) is 10.984.

Electron micrographs, micro-autoradiographs and X-ray diffraction studies showed good monogeneity of the plutonium and uranium distribution as well as few voids and cracks of the products.

It should be understood, of course, that the foregoing disclosure relates to only preferred embodiments of the invention and that it is intended to cover all changes, modifications and combinations of the examples of the invention herein chosen for the purposes of the disclosure, which do not constitute departures from the spirit and scope of the invention set forth in the appended claims.

What is claimed is:

1. A process for the praduction of UO₂-PuO₂ compositions of high density and coarse particles suitable for vibratory compaction, comprising the steps of preparing a uranium hydroxide gel; mixing the gel with a finely divided, PuO₂ yielding, plutonium compound; concentrating the mixture by stirring and maintaining the mixture at a temperature substantially in the range 80 to 120° C. until the uranium plus plutonium concentration becomes substantially 40 to 50 weight percent; drying the concentrated mixture substantially in the range 1 to 3 days substantially at a temperature in the range 60 to 95° C.; dehydrating the dried mixture in a reducing atmosphere for a period of about 2 hours at a temperature of about 800° C.; and sintering the dehydrated mixture in a reducing atmosphere for a period of about 3 hours at a temperature of about 1400° C.

2. A process as claimed in claim 1, said plutonium compound being plutonium hydroxide gel.

3. A process as claimed in claim 2, said uranium hydroxide and plutonium hydroxide gels being prepared by adding ammonium hydroxide to acidic uranous and plutonium ionic solutions to produce the sols thereof, heating and aging the sols for about 20 hours at a temperature of about 95° C., and purifying the gels resulting from the heating and aging.

4. A process as claimed in claim 3, wherein the uranous solution comprises uranous chloride, the volume of concentrated ammonium hydroxide to be added to the uranous chloride solution being given by the following formula:

Conc. NH₄OH ml. (per liter of the uranous chloride solution) $=\alpha X + 0.476Y + 1.828Z$

| α: | Free HCl (g./l.) |
|---|---|
| 0.952 | 6–15 |
| 0.967 | 16–25 |
| 0.981 | 26–35 | where:
$X = U^{+4}$ (g./l.)
$Y = U^{+6}$ (g./l.)
$Z =$ free HCl (g./l.)

5. A process as claimed in claim 3, said plutonium ionic solution being plutonium nitrate solution valence-adjusted to Pu (IV) by the addition of hydrogen peroxide, sufficient ammonium hydroxide being added to the adjusted solution to brings its pH to substantially 1.

6. A process as claimed in claim 1, said plutonium compound being selected from the group consisting of plutonium hydroxide precipitate, plutonium oxalate, plutonium dioxide, plutonium hydroxide, and plutonium peroxide; the step of drying being substantially in the range 1 to 3 days substantially at a temperature in the range 60 to 95° C.; the step of dehydrating being conducted in a reducing atmosphere for a period of about 2 hours at a temperature of about 800° C.; the step of sintering being conducted in a reducing atmosphere for a period of about 3 hours at a temperature of about 1400° C.

7. A process as claimed in claim 6, said uranium hydroxide gel being prepared by adding ammonium hydroxide to acidic uranous ionic solution to produce sol, heating and aging the sol for about 20 hours at a temperature of about 95° C., and purifying the gel resulting from the heating and aging.

8. A process as claimed in claim 7, wherein the uranous solution comprises uranous chloride, the volume of concentrated ammonium hydroxide to be added to the uranous chloride solution being given by the following formula:

Conc. NH$_4$OH ml. (per liter of the uranous chloride solution) = $\alpha X + 0.476 Y + 1.828 Z$

| $\alpha$: | Free HCl (g./l.) |
|---|---|
| 0.952 | 6–15 |
| 0.967 | 16–25 |
| 0.981 | 26–35 | where:
$X = U^{+4}$ (g./l.)
$Y = U^{+6}$ (g./l.)
$Z =$ free HCl (g./l.)

9. A process as claimed in claim 6, said plutonium compound being plutonium hydroxide precipitate, said precipitate being prepared by adding sufficient ammonium hydroxide to valence-adjusted plutonium nitrate solution to bring its pH to substantially between 3 and 10 and by purifying the resulting precipitate.

10. A process as claimed in claim 6, said plutonium compound being PuO$_2$ prepared by precipitating plutonium oxalate from valence-adjusted plutonium nitrate solution, washing the oxalate precipitate, drying the washed precipitate and calcining the dried precipitate in air.

11. A process as claimed in claim 6, said plutonium compound being plutonium peroxide prepared by adding hydrogen peroxide to valence-adjusted plutonium nitrate solution, washing the resulting precipitate, and drying the washed precipitate.

12. A process as claimed in claim 6, said plutonium compound being PuO$_2$ prepared by precipitating plutonium peroxide from valence-adjusted plutonium nitrate solution, washing the resulting precipitate, drying the washed precipitate and calcining the dried precipitate.

References Cited
UNITED STATES PATENTS

| 3,171,815 | 3/1965 | Kelly et al. | 252—301.1 |
| 3,228,886 | 1/1966 | Lloyd | 252—301.1 |
| 3,254,030 | 5/1966 | Michaud et al. | 252—301.1 |
| 3,262,760 | 7/1966 | Morse et al. | 252—301. 1 X |
| 3,287,279 | 11/1966 | Lyon | 252—301.1 |
| 3,331,785 | 7/1967 | Fitch et al. | 252—301.1 |

LELAND A. SERASTIAN, Primary Examiner

U.S. Cl. X.R.
176—89; 264—0.5